(12) United States Patent
Paterno

(10) Patent No.: US 6,366,562 B1
(45) Date of Patent: Apr. 2, 2002

(54) MONITOR PARTICULARLY SUITED FOR NAVAL TACTICAL DATA SYSTEM INTERFACE TYPE E

(75) Inventor: Robert M. Paterno, Orange, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/053,712

(22) Filed: Apr. 2, 1998

(51) Int. Cl.[7] ................................................. H04M 1/29
(52) U.S. Cl. ....................... 370/247; 370/248; 375/224; 379/12
(58) Field of Search ................................. 370/241, 243, 370/244, 245, 247, 248; 375/224, 228, 258; 379/1, 4, 12

(56) References Cited

U.S. PATENT DOCUMENTS

| | | | |
|---|---|---|---|
| 5,323,256 A | 6/1994 | Banks | 359/147 |
| 5,388,210 A | 2/1995 | Clayton et al. | 395/200 |
| 5,406,091 A | 4/1995 | Burba et al. | 250/551 |
| 5,457,729 A | * 10/1995 | Hamann et al. | 370/252 |
| 5,614,896 A | 3/1997 | Monk et al. | 340/945 |
| 5,661,583 A | 8/1997 | Nhu | 359/173 |

* cited by examiner

Primary Examiner—Wellington Chin
Assistant Examiner—Frank Duong
(74) Attorney, Agent, or Firm—James B. Bechtel, Esq.; John P. McMahon, Esq.

(57) ABSTRACT

A monitor is provided that is used to transmit data being exchanged over a NTDS Type E interface to an instrumentation system. The monitor is electrically isolated from the instrumentation system and comprises a directional coupler that passes and inhibits selected data to and from the instrumentation system.

15 Claims, 3 Drawing Sheets

MONITOR PARTICULARLY SUITED FOR NAVAL TACTICAL DATA SYSTEM INTERFACE TYPE E

STATEMENT OF GOVERNMENT INTEREST

The invention described herein may be manufactured and used by or for the Government of the United States of America, for governmental purposes, without the payment of any royalty thereof or therefor.

BACKGROUND OF THE INVENTION

The present invention relates to the monitoring, and more particularly, to a monitor that is interposed between first and second digital equipment that exchanges digital information therebetween and the monitor is magnetically coupled to and routes the exchangeable digital information to means for capturing, recording, and analyzing the routed digital information.

An increasing complexity of computerized systems has created a need for a concomitant developmental engineering evaluation equipment for monitoring computer interfaces, such as the interfaces found in military installations that employ a Naval Tactical Data System (NTDS) protocol. The NTDS protocol comprises serial and parallel transmission techniques conforming to military specifications, such as military standard, input/output interfaces, standard digital data, Navy systems, MIL-Standard-1397C, herein incorporated by reference and which defines and describes the parameters of the Naval Tactical Data System (NTDS) interfaces which are of particular importance to the present invention. Systems which meet the requirements of military specifications are known and one such system is described in U.S. Pat. No. 5,661,583, which is herein incorporated by reference.

A NTDS interface which is of particular importance to the present invention is the NTDS Type E interface. The Type E interface consists of two digital equipment, one designated as an output function (source) and the other designated as an input function (sink). The source is that end of the Type E interface which transmits informational frames (IFs). The sink is that end of the Type E interface which receives IFs. Both the sink and the source are capable of transmitting and receiving control frames. The Type E interface transfers IFs from the source to the sink after the exchange of control frames. The NTDS Type E interface is more fully described in MIL-Standard-1397C.

A monitoring activity commonly involved with a NTDS Type E interface may be conducted for such practices as verifying proper computer control of a sensor, developing algorithms for data processing, verifying system performance, and other tasks related to computerized system development, acceptance, or improvement. The physical parameters of the environment in which the monitoring activity is conducted, especially for NTDS interfaces, varies from a relatively benign laboratory setting to the more severe shipborne embedded installations. Similarly, the range of cost factors that accompanies the monitoring activity varies from the relatively inexpensive laboratory testing to the expensive and critical data collection missions aboard a Navy vessel.

The monitoring activity typically involves routing digital data under consideration to means for capturing, recording and analyzing the digital data, such as that described in U.S. Pat. No. 5,614,896 which is herein incorporated by reference. This capturing, recording and analyzing means is commonly referred to as an instrumentation system, which terminology is used herein.

Various attempts to provide equipment for monitoring the activity for a NTDS interface have been made, but each suffered a shortcoming with respect to disturbing the interface or computerized system under the test. One such attempt that does not involve any hardwired interface between the involved equipment, but rather is handled by providing a dedicated output channel of the computerized equipment being monitored and analyzed. The dedicated channel provides associated output digital information directly to the instrumentation system. This approach is expensive in that it consumes a data channel of the computerized equipment being analyzed. It is desired that means be provided for routing the data being exchanged over a digital interface, especially a NTDS Type E interface, between first and second digital equipment to an instrumentation system without consuming a dedicated data channel of either of first or second digital equipment under analysis.

SUMMARY OF THE INVENTION

The present invention is directed to a monitor interposed between first and second digital equipment and routing the information exchanged between the first and second digital equipment to an instrumentation system, without causing any disruption of the digital data and without the consuming of a dedicated data channel of either of the first or second digital equipment under analysis.

The monitor is interposed between the first and second digital equipment that communicate with each other by digital signals in accordance with a first protocol. The first and second equipment have respective first and second connectors and conductors for carrying respective digital signals. The monitor has a ground connection that is magnetically isolated from a ground connection of an instrumentation system. The monitor comprises a directional coupler having an output and an input connected to the first and second connectors. The directional coupler directs and allows the digital signals of the first digital equipment to pass to its output and, conversely, inhibits the digital signals of the second digital equipment from passing to its output. The monitor further comprises an isolation coupling transformer having an input stage to receive the digital signals at the output of the directional coupler and an output stage connected to the instrumentation system.

OBJECTS OF THE INVENTION

Accordingly, it is a primary object of the present invention to provide a monitor for routing the digital information being exchanged over an NTDS interface, such as the NTDS Type E interface, to an instrumentation system and to also provide isolation between the instrumentation's system ground and the monitor's ground.

It is a further object of the present invention to isolate the monitor and instrumentation system grounds by the use of a high frequency coupling transformer so as to satisfy the requirements of a NTDS type E interface.

It is another object of the present invention to provide a monitor for routing information to an instrumentation system while at the same time preserving the controlled impedance of the NTDS interface being monitored.

It is another object of the present invention to provide for a monitor that creates little if any noise that might be reflected back onto the NTDS interface being monitored.

Furthermore, it is an object of the present invention to provide for a monitor that may be located at a relatively long distance from the instrumentation system so as to accommodate the needs of the instrumentation system's shipborne environment.

Another object of the present invention is to provide for a monitor that does not delay the data being transferred between the equipment (source and sink) at either end of the NTDS Type E interface.

It is a further object of the present invention to provide a monitor that is adaptable to the NTDS Type E interface in that allows the monitor to relay data from the source NTDS equipment to the instrumentation system and inhibit data from the sink NTDS equipment from reaching the instrumentation system.

Other objects, advantages and novel features of the invention will become apparent from the following detailed description when considered in conjunction with the accompanying drawings therein.

DETAILED DESCRIPTION OF THE PREFERRED EMBODIMENTS

Figure 1:
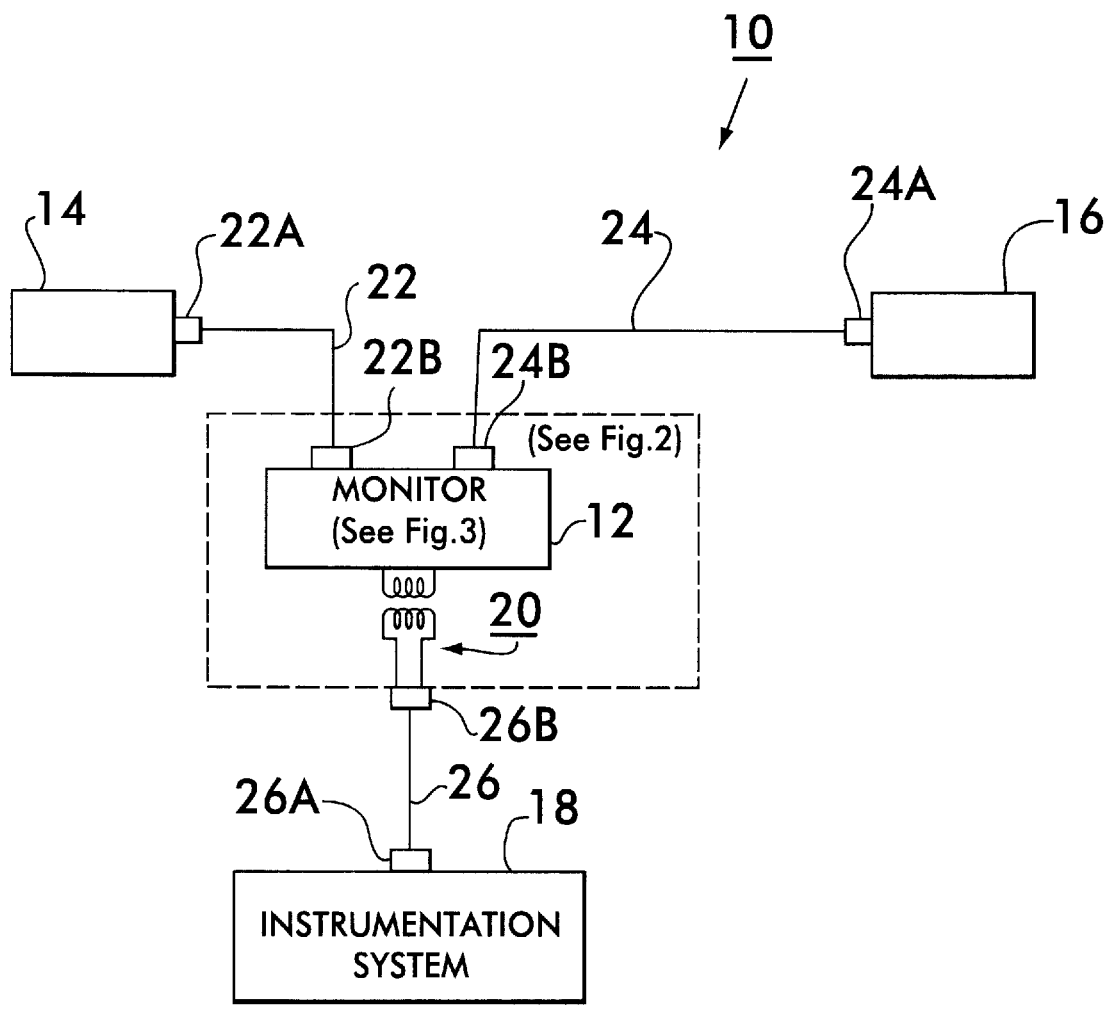
FIG. 1 illustrates the interconnection between the monitor, the first and second digital equipment, and instrumentation system of the present invention.

Referring now to the drawings, wherein the same reference number indicates the same element throughout, there is shown in FIG. 1 an arrangement 10, wherein a monitor 12, which is of primary importance to the present invention, is interposed between first and second digital equipment 14 and 16, respectively, that communicate with each other by digital signals, and wherein such digital signals are routed to an instrumentation system 18 by way of the monitor 12. The monitor 12 has an isolation coupling transformer 20 for coupling to the instrumentation system 18.

The monitor 12 allows for monitoring activities to be conducted for analysis purposes, verifying proper computer control, developing algorithms for data processing, verifying system performance, and other tasks related to the computerized system made up of either or both of first and second digital equipment 14 and 16 respectively.

In general, the monitor 12 is interposed between first and second digital equipment 14 and 16 that communicate with each other by digital signals in accordance with a first protocol. The first and second equipment have respective first and second connectors and conductors for carrying respective digital signal. The monitor has a ground connection that is magnetically isolated from a ground connection of the instrumentation system 18 by means of the transformer 20. The monitor 12 comprises a directional coupler having an output and an input connected to the first and second connectors. The directional coupler directs and allows the digital signals of the first digital equipment to pass to its output and, conversely, inhibits the digital signals of the second digital equipment to pass to its output.

More particularly, the first and second digital equipment 14 and 16, respectively, may form a communication network particularly suited for military installations that employed a first protocol, which may be a NTDS protocol defined by military specification, MIL-Standard-1397C previously mentioned, and which is applicable to Naval Tactical Data System (NTDS) which is of importance to the present invention. The NTDS protocols involve various interfaces, wherein NTDS Type E interface is of particular importance to the present invention. The first and second digital equipment 14 and 16 are interchangeably referred to herein as NTDS equipment 14 and 16, respectively, which, in turn, may be referred to herein as source and sink equipment 14 and 16 respectively.

For the NTDS Type E interface, the NTDS equipment 14 may serve as the source digital equipment known in the art, whereas the NTDS equipment 16 may serve as the sink equipment, also known in the art. The functional requirements, as previously mentioned, of the source and sink equipment for the NTDS Type E interface are more fully described in MIL-Standard-1397C. The monitor 12 is connected to NTDS equipment 14 by way of cable 22 having connectors 22A and 22B and is connected to NTDS equipment 16 by way of cable 24 having connectors 24A and 24B. Furthermore, the monitor 12 is connected to the instrumentation system 18 by way of cable 26 having connectors 26A and 26B. The cables 22, 24 and 26, as well as the connectors 22A, 22B, 24A, 24B, 26A and 26B, may be those cables and connectors defined by MIL-Standard-1397C.

The instrumentation system 18 serves as the means for capturing/recording/analyzing the digital signals being exchanged between the NTDS equipment 14 and 16. The instrumentation system 18 may comprise means for capturing and recording a plurality of data transmissions occurring between the NTDS equipments 14 and 16, and means for analyzing the data transmissions for the developmental engineering purposes or for fault analysis purposes.

The instrumentation system 18 receives, by way of monitor 12, the digital information shared by the NTDS equipment 14 and 16. The interconnections of the monitor 12 to the NTDS equipment 14 and 16, as well as to the instrumentation system 18, may be further described with reference to FIG. 2.

Figure 2:
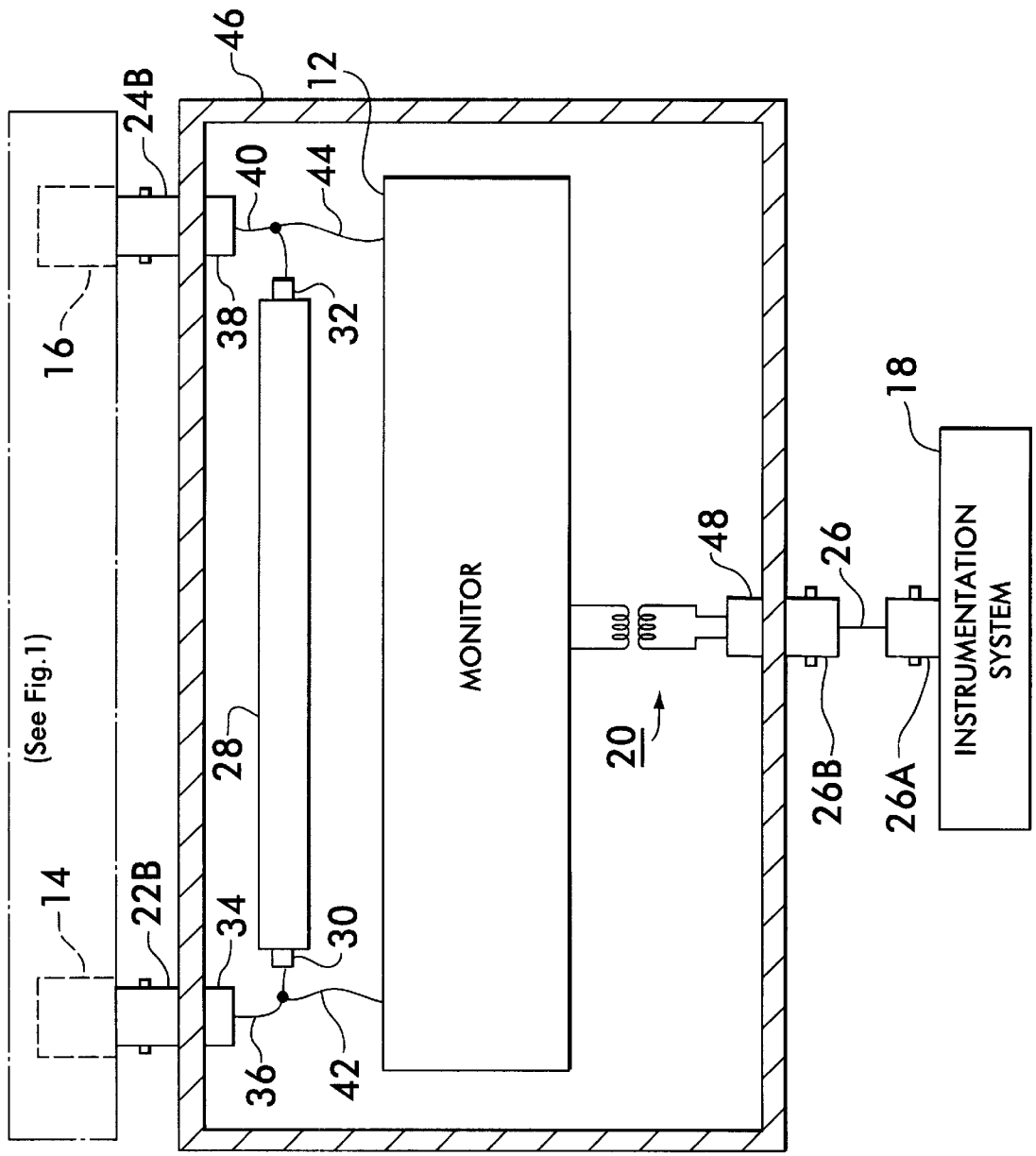
FIG. 2 illustrates the details of the interface between the monitor and the first and second digital equipment of FIG. 1.

In general, FIG. 2 illustrates the monitor 12 which cooperates with a time delay means 28 to form a directional coupler allowing the NTDS equipment 14, termed the source equipment, to transmit its information to the instrumentation system 18, but inhibit the NTDS equipment 16, termed the sink equipment, from transmitting its information to the instrumentation system 18.

The time delay means 28 serves as a coaxial delay and has an input 30 and an output 32, with the input 30 connected to the connector 22B of the source 14, via a connector 34 and a wire or conductor 36, and with the output 32 connected to the connector 24B of the sink equipment, via a connector 38 and a wire or conductor 40. The time delay means 28 has a predetermined time delay, such as about 15 nanoseconds, so that the digital signal first appearing at its input 30 subsequently appears at the output 32. Similarly, the same time delay is encountered when the signal first appearing at the output 32 subsequently appears at the input 30. The source equipment 14, more particularly its digital signals available at connector 22B, by way of connectors 22B and 34 and a conductor 42, is routed to monitor 12, and similarly, sink equipment 16, more particularly its digital signals available at connector 24B, is connected to monitor 12 by way of connectors 24B and 38 and a conductor 44. The connectors 22B, 24B, 34 and 38 are mounted on a frame 46 of the monitor 12.

As seen in FIG. 2, the monitor 12 does not impose any intervening electronics between the source equipment 14 and the sink equipment 16, but rather, merely inserts the coaxial delay 28 therebetween which is high reliability, and, thus, does not degrade the overall reliability of either the source equipment 14 nor the sink equipment 16. As further seen in FIG. 2, the output of the monitor 12 is directed to the input stage of isolation coupling transformer 20 which, in turn, has its output stage connected to the instrumentation system 18 by way of connectors 48, 26A and 26B and cable 26.

In general, the monitor 12 employs high impedance input devices, as well as low noise generating devices so that the NTDS Type E interface is not degraded by way of impedance loading or by way of noise generation. The monitor 12 may be further described with reference to FIG. 3.

Figure 3:
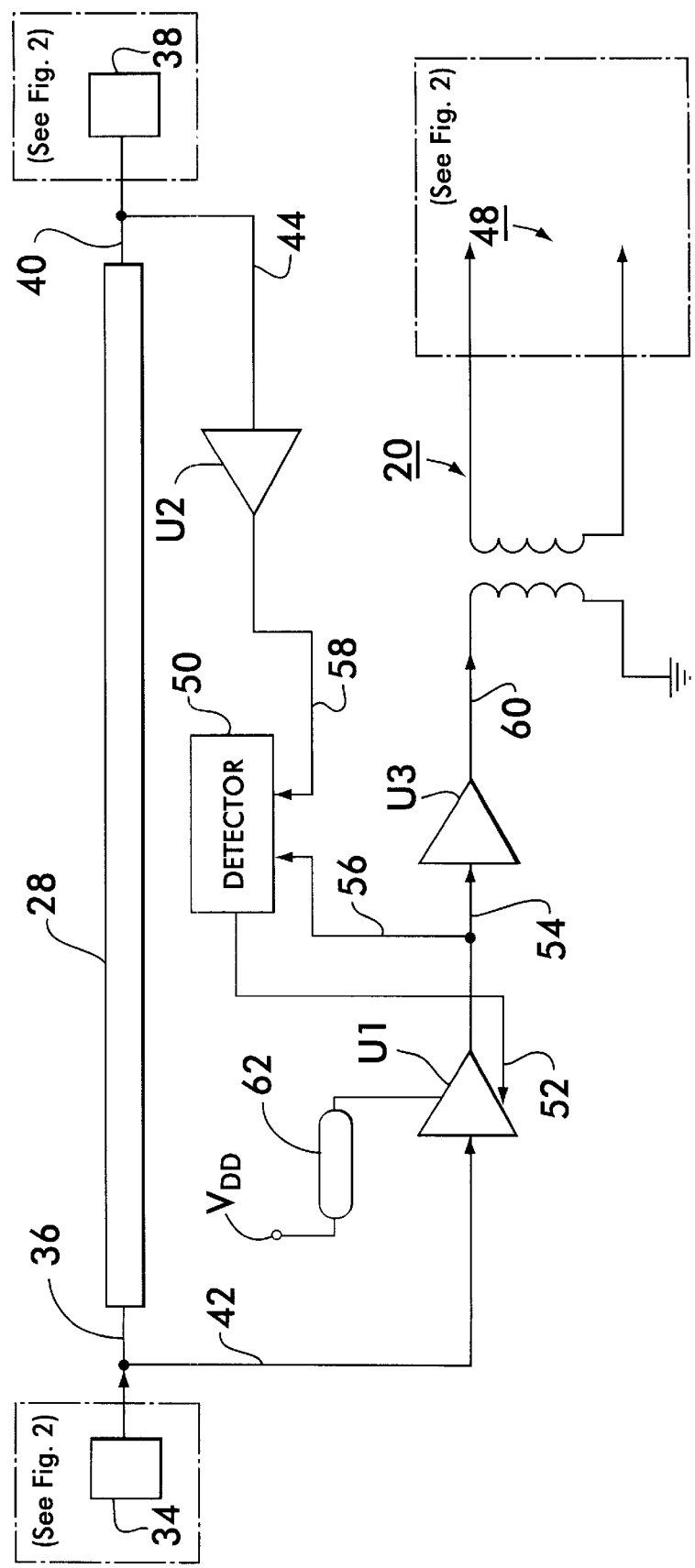
FIG. 3 is a schematic of the monitor of FIG. 1.

FIG. 3 illustrates the monitor 12 as being comprised of the first amplifier, preferably a comparator U1, a second amplifier, preferably a comparator U2, and a third amplifier, preferably a driver U3, and a detector 50. The comparators U1 and U2 are preferred to be of a type specified by MIL-Standard-1397C responsive to desired switching thresholds. More particularly, if the input information, having its accompanying logic levels, being applied to the respective comparators U1 or U2 does not meet the threshold logic levels specified for desired NTDS operation, then the respective comparator U1 or U2 does not pass its applied input information onto its output stage. The driver U3 is preferably the line driver type specified by MIL-Standard-1397C, and the detector 50 has a switching response, to be described, that is less than the predetermined delay of the time delay means 28.

The first comparator U1 has an output and its input is connected to the conductor 42 associated with the source equipment 14 carrying respective digital signals thereof. The first comparator is responsive to non-presence of a first control signal generated by the detector 50 and appearing on signal path 52. The non-presence of the first control signal allows the first comparator U1 to pass the digital information of the source equipment 14 onto its output which, in turn, is applied to the driver U3 via signal path 54, and to the detector 50 via signal path 56.

The second comparator U2 has an output and its input is connected to the connector 38 via conductor 44 carrying the respective digital signals of the sink equipment 16. The second comparator U2 passes the digital signals of the sink equipment 16 to its output which, in turn, is routed to detector 50 via signal path 58.

The detector 50, as will be further described, generates the presence of the first control signal during the presence of digital signals of the sink equipment 16 on conductor 44. The non-presence of the first control signal allows the comparator U1 to deliver its output signals, that is, the digital signals of the source equipment 16 amplified and compared by comparator U1, to the driver U3 which has its output connected to the input stage of the isolation transformer 20 which, in turn, has its output connected to the instrumentation system 18 by way of signal path 48.

In operation, using the NTDS Type E interface as an example, when the sink equipment 16 generates digital signals they arrive at the input of comparator U2 prior to their arriving at the input of the U1 comparator by an amount of time determined by the time delay device 28. The detector 50, which is a high speed switching digital circuit, senses, during this brief period determined by the predetermined time delay of the time delay means 28, that the comparator U2 has detected a digital signal and that the comparator U1 has not detected a digital signal. This logic condition causes the detector 50 to activate the first control signal that is applied on signal path 52 so as to disable the comparator U1 thus, preventing the comparator U1 output from being applied to the driver U3 and maintaining the comparator U1 output at its original state, that is, being rendered non-conductive. Under these set of conditions, the output state reinforces itself and the monitor 12 logic remains locked onto this condition (no information is passed onto the instrumentation system 18) until data from the sink equipment 16 is no longer present on signal path 44.

Furthermore, with regard to this example for the NTDS Type E interface, a signal originating from the source equipment 14 arrives at the input of the comparator U1 prior to its arriving at the input of comparator U2 by an amount of time determined by the predetermined time delay of time delay means 28. The detector 50 senses, via signal path 56, during this time that comparator U1 has detected the signal and that comparator U2 has not detected the signal. This logic condition causes the detector 50 to maintain the non-presence of the first control signal applied to the comparator U1 via signal path 52 thus, enabling the comparator U1 to deliver its output to the driver U3 for the duration of time that the digital signal is generated by the source equipment 14.

The output of the driver U3, via signal path 60, is coupled through the isolation transformer 20 and to the instrumentation system 18. Accordingly, the monitor 12 achieves the directional coupler function of relaying source data that is generated by the source equipment 14 to the instrumentation system 18, and inhibiting sink data to the instrumentation system 18 that is generated by sink equipment 16.

The isolation coupling transformer 20 satisfies the NTDS Type E interface requirements in providing electrical isolation between the ground connection of the monitor 12 and the instrumentation system's 18 ground. This isolation obliviates the undesirable ground loop currents and potentially disruptive noise that might otherwise be induced by the instrumentation system 18 and which may find its way back onto the NTDS Type E interface and into the NTDS equipment 14 and 16.

The driver U3 being preferably of the NTDS Type allows for the information generated by the monitor 12 to be delivered to the instrumentation system 18 which may be remotely located at a relatively long distance, such as 1,000 feet. The remote location capability allows the instrumentation system to be conveniently located which is especially beneficial in tight quarters found on shipborne equipment.

The monitor 12 preferably further comprises a fusing system 62 having a value selected so as to rupture upon the event of any catastrophic component failure internal to the monitor 12. The internal fuse 62, only schematically and partially shown, disconnects the primary power to the monitor 12 which, in turn, disconnects any possible current drain of the monitor 12 from the primary power that might otherwise effect the operation of the NTDS interface established the NTDS equipment 14 and 16.

The utilization of the NTDS comparator U1 and driver U3 preserves the controlled impedance desired for the NTDS interface which, in turn, prevents any disruption of the NTDS signal being exchanged between the NTDS equipment 14 and 16 that might be otherwise caused by the operation of the monitor 12 or by the operation of the instrumentation system 18.

It should now be appreciated that the practice of the present invention provides for a monitor that meets the needs of the NTDS interface and allows for the information present on the NTDS interface to be routed to the instrumentation system 18 and provides a isolation transformer between the instrumentation system 18 and the monitor 12.

Obviously, many modifications and variations of the present invention are possible in light of the foregoing teaching. It is, therefore, to be understood that within the scope of the appended claims, the invention may be practiced otherwise than as specifically described.

What I claim is:

1. A monitor interposed between first and second digital equipment that communicate with each other by digital signals in accordance with a first protocol, said first and second equipment having respective first and second connectors and conductors for carrying respective digital signals, said monitor having a ground connection that is magnetically isolated from a ground connection of an instrumentation system, said monitor comprising:

(a) a directional coupler having an output and an input connected to said first and second connector, said directional coupler directing and allowing the digital signals of said first digital equipment to pass to its said output and, conversely, inhibiting the digital signals of said second digital equipment from passing to its said output; and (b) an isolation coupling transformer having an input stage to receive the digital signals at said output of said directional coupler and an output stage connected to the instrumentation system.

2. A monitor interposed between first and second digital equipment that communicate with each other by digital signals in accordance with a Naval Tactical Data System (NTDS) protocol and said first and second equipment being NTDS equipment respectively designated as a source and a sink and communicate with each other by means of a Type E NTDS interface, said first and second equipment having respective first and second connectors and conductors for carrying respective digital signals, said monitor having a ground connection that is magnetically isolated from a ground connection of an instrumentation system, said monitor comprising:

(a) a directional coupler having an output and an input connected to said first and second connector, said directional coupler directing and allowing the digital signals of said first digital equipment to pass to its said output and, conversely, inhibiting the digital signals of said second digital equipment from passing to its said output; and (b) an isolation coupling transformer having an input stage to receive the digital signals at said output of said directional coupler and an output stage connected to the instrumentation system.

3. The monitor according to claim 2, wherein said directional coupler comprises:

(a) time delay means having an input and an output with the input connected to the connector of said source and with the output connected to the connector of said sink, said time delay means having a predetermined time delay provided between its input and output;

(b) a first amplifier having an output and an input connected to the connector of said source carrying respective digital signals, said first amplifier being responsive to the non-presence of a first control signal for passing said digital signals of said source to its output;

(c) a second amplifier having an output and an input connected to the connector of said sink carrying respective digital signals, said second amplifier passing said digital signals of said sink to its output;

(d) a detector connected to the outputs of said first and second amplifiers and generating the presence of said first control signal during the presence of said digital signals of said sink at said output of said second amplifier; and (e) a driver having an input connected to the output of said first amplifier and having an output connected to the input stage of said isolation coupling transformer.

4. The monitor according to claim 3, wherein said time delay is selected so that said predetermined time delay is about 15 nanoseconds.

5. The monitor according to claim 3, wherein said first and second amplifiers are comparators of the NTDS type.

6. The monitor according to claim 3, wherein said driver is of the NTDS type.

7. The monitor according to claim 3, wherein said detector has a predetermined response time which is less than said predetermined delay of said time delay means.

8. The monitor according to claim 1 further comprising a fuse having a predetermined level for protecting said monitor.

9. A monitor interposed between first and second digital equipment that communicate with each other by digital signals in accordance with a first protocol, said first and second equipment having respective first and second connectors and conductors for carrying respective digital signals, said monitor having a ground connection that is magnetically isolated from a ground connection of an instrumentation system, said monitor comprising:

(a) a directional coupler comprising a time delay means to having an output and an input connected to said first and second connector, said time delay means having a predetermined time delay providing an intentional time delay for any signal traveling from said input of said time delay means to said output of said time delay, said directional coupler directing and allowing the digital signals of said first digital equipment to pass to its said output and, conversely, inhibiting the digital signals of said second digital equipment from passing to its said output; and (b) an isolation coupling transformer having an input stage to receive the digital signals at said output of said directional coupler and an output stage connected to the instrumentation system.

10. The monitor according to claim 9, wherein said directional coupler further comprises remains in:

(a) a first amplifier having an output and an input connected to the connector of said source carrying respective digital signals, said first amplifier being responsive to the non-presence of a first control signal for passing said digital signals of said source to its output;

(b) a second amplifier having an output and an input connected to the connector of said sink carrying respective digital signals, said second amplifier passing said digital signals of said sink to its output;

(c) a detector connected to the outputs of said first and second amplifiers and generating the presence of said first control signal during the presence of said digital signals of said sink at said output of said second amplifier; and (d) a driver having an input connected to the output of said first amplifier and having an output connected to the input stage of said isolation coupling transformer.

11. The monitor according to claim 9, wherein said time delay is selected so that said predetermined time delay is about 15 nanoseconds.

12. The monitor according to claim 10, wherein said first and second amplifiers are comparators of the NTDS type.

13. The monitor according to claim 10, wherein said driver is of the NTDS type.

14. The monitor according to claim 10, wherein said detector has a predetermined response time which is less than said predetermined delay of said time delay means.

15. The monitor according to claim 2, further comprising a fuse having a predetermined level for protecting said monitor.

* * * * *